US012052792B2

(12) United States Patent
Harris

(10) Patent No.: US 12,052,792 B2
(45) Date of Patent: Jul. 30, 2024

(54) PASSIVE MODE TRANSITION FOR USER EQUIPMENT BASED ON CONTROL PLANE MONITORING

(71) Applicant: Nokia Technologies Oy, Espoo (FI)

(72) Inventor: John Harris, Whitefish Bay, WI (US)

(73) Assignee: Nokia Technologies Oy, Espoo (FI)

( * ) Notice: Subject to any disclaimer, the term of this patent is extended or adjusted under 35 U.S.C. 154(b) by 372 days.

(21) Appl. No.: 17/636,407

(22) PCT Filed: Aug. 29, 2019

(86) PCT No.: PCT/US2019/048878
§ 371 (c)(1),
(2) Date: Feb. 18, 2022

(87) PCT Pub. No.: WO2021/040724
PCT Pub. Date: Mar. 4, 2021

(65) Prior Publication Data
US 2022/0287139 A1    Sep. 8, 2022

(51) Int. Cl.
*H04W 76/27* (2018.01)

(52) U.S. Cl.
CPC .................. *H04W 76/27* (2018.02)

(58) Field of Classification Search
CPC ..... H04W 76/10; H04W 76/27; H04W 76/28; H04W 76/30
See application file for complete search history.

(56) References Cited

U.S. PATENT DOCUMENTS

| 8,213,915 B1 * | 7/2012 | Upadhyay ............... H04L 67/02 455/414.3 |
| 9,019,877 B2 * | 4/2015 | Young .................... H04W 72/02 370/311 |
| 2004/0125800 A1 * | 7/2004 | Zellner ................. H04W 72/56 370/389 |

(Continued)

FOREIGN PATENT DOCUMENTS

| WO | 2012/008886 A1 | 1/2012 |
| WO | 2013/172648 A1 | 11/2013 |
| WO | 2014/209189 A1 | 12/2014 |

OTHER PUBLICATIONS

"Restricting Unattended/Background Data Traffic", 3GPP TSG-RAN WG2 Meeting #91Bis, R2-154033, Agenda: 7.18, Verizon, Oct. 5-9, 2015, 8 pages.

(Continued)

*Primary Examiner* — Jean A Gelin
(74) *Attorney, Agent, or Firm* — Nokia Technologies Oy

(57) ABSTRACT

User Equipment (UE), methods, and software that selectively transfer data to a mobile network. In one embodiment, the UE identifies data buffered for one or more applications miming on the UE while the UE is in non-connected mode, determines a number of other UEs receiving signaling messages on a control plane to transition from non-connected mode to connected mode, and estimates a load on the control plane based on the number of other UEs receiving signaling messages to transition from non-connected mode to connected mode. The UE defers a transition from non-connected mode to connected mode to delay a transfer of the data from the UE to the mobile network over the radio interface when the load on the control plane exceeds a threshold.

14 Claims, 7 Drawing Sheets

(56) References Cited

U.S. PATENT DOCUMENTS

| | | | | |
|---|---|---|---|---|
| 2008/0153489 | A1* | 6/2008 | Lee | H04W 8/085 |
| | | | | 455/435.1 |
| 2009/0015523 | A1* | 1/2009 | Matsudate | H10K 59/35 |
| | | | | 315/169.3 |
| 2012/0131125 | A1* | 5/2012 | Seidel | H04N 5/76 |
| | | | | 709/212 |
| 2015/0095509 | A1* | 4/2015 | Huang | H04L 65/80 |
| | | | | 709/231 |
| 2015/0281934 | A1* | 10/2015 | Kawaguchi | H04W 4/02 |
| | | | | 370/259 |
| 2016/0302251 | A1* | 10/2016 | Chatterjee | H04W 8/02 |
| 2018/0020487 | A1* | 1/2018 | Tsai | H04W 72/0446 |
| 2018/0295603 | A1* | 10/2018 | Saily | H04W 68/005 |
| 2018/0316476 | A1* | 11/2018 | Sugaya | H04L 69/324 |
| 2018/0359334 | A1* | 12/2018 | Shimizu | H04W 4/24 |
| 2019/0021130 | A1* | 1/2019 | Kim | H04W 72/23 |
| 2019/0182874 | A1* | 6/2019 | Cho | H04W 28/0268 |
| 2019/0261351 | A1* | 8/2019 | Zhou | H04W 92/04 |
| 2019/0394671 | A1 | 12/2019 | Harris | |
| 2020/0059935 | A1* | 2/2020 | Qian | H04W 72/52 |
| 2021/0160805 | A1* | 5/2021 | Xu | H04W 56/0015 |
| 2021/0204240 | A1* | 7/2021 | Ma | H04W 68/005 |
| 2024/0073796 | A1* | 2/2024 | Azizi | H04W 24/08 |

OTHER PUBLICATIONS

"Restricting Unattended/Background Data Traffic", 3GPP TSG-RAN WG2 Meeting #91Bis, R2-153301, Agenda: 7.13, Verizon, Aug. 24-28, 2015, 8 pages.

"3rd Generation Partnership Project; Technical Specification Group Services and System Aspects; System Architecture for the 5G System; Stage 2 (Release 16)", 3GPP TS 23.501, V16.1.0, Jun. 2019, pp. 1-368.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.6.0, Jun. 2019, pp. 1-960.

International Search Report and Written Opinion received for corresponding Patent Cooperation Treaty Application No. PCT/US2019/048878, dated May 8, 2020, 10 pages.

"Reusing Keep UE in connected mode solution in MTCe for signalling overload mitigation", SA WG2 Meeting #96, S2-130956, Agenda: 7.10, China Unicom, Apr. 8-12, 2013, pp. 1-2.

* cited by examiner

PASSIVE MODE TRANSITION FOR USER EQUIPMENT BASED ON CONTROL PLANE MONITORING

RELATED APPLICATION

This application claims priority to PCT Application No. PCT/US2019/048878, filed on Aug. 29, 2019, each of which is incorporated herein by reference in its entirety.

TECHNICAL FIELD

This disclosure is related to the field of communication systems and, in particular, to mobile devices that access services from a mobile network.

BACKGROUND

Mobile devices (also referred to herein as User Equipment (UE)) provide customers access to a variety of types of data services from a mobile network. A typical mobile device may include multiple applications running simultaneously that request to send data to, or receive data from, the mobile network over a radio interface. Due to the variety of different mobile devices and the number of data services available to customers, the use of data services is likely to increase, especially when next generation (e.g., Fifth Generation (5G)) networks come online with improved speeds and connectivity.

In Long-Term Evolution (LTE), a UE may be in idle mode where no radio bearer is established, or in connected mode where a radio bearer is established. When initially powering on, after a period of inactivity, etc., the UE will be in idle mode. In order to transfer data from the UE to a mobile network, the UE transitions from idle mode to connected mode. Signaling messages, such as the ones used to transition a UE from idle mode to connected mode, are transferred via protocols of the control plane. The volume of signaling messages may exceed the capacity of the control plane, especially in situations where a large number of UEs are located within a cell. This may be a problem as UE connectivity to the mobile network may be barred or delayed. It is therefore desirable to identify ways for UEs to efficiently share control plane resources.

SUMMARY

Described herein is a UE (and associated methods and software) that estimates a load on the control plane, and defers a transition from non-connected mode (e.g., idle mode) to connected mode when the load exceeds a threshold. A UE typically includes one or more applications that request to transfer data to the mobile network. If a user is actively using an application, the application may request to transfer data to the mobile network based on input from the user (generally referred to as foreground data). Even if the user is not actively using an application, the application may request to transfer data to the mobile network (generally referred to as unattended or background data). A UE as described herein is configured to defer a transition from non-connected mode to connected mode to transfer foreground data and/or background data based on the load on the control plane. This is beneficial in that the UE "passively" transitions from non-connected mode to connected mode, and delays a data transfer when the control plane is at or near its limit. A passive mode transition may be especially beneficial for handling background data. It is estimated that background data transfers may be a large fraction of connection requests by a UE. A UE as described herein is able to delay background data transfers in scenarios where the control plane is at or near its limit so that the signaling messages required for the background data transfers do not compromise the control plane resources.

One embodiment comprises a UE configured to communicate with a mobile network over a radio interface. The UE comprises at least one processor, and at least one memory including computer program code executable by the processor. The processor is configured to cause the UE to identify data buffered for one or more applications running on the UE while the UE is in non-connected mode, determine (while in non-connected mode) a number of other UEs receiving signaling messages on a control plane to transition from non-connected mode to connected mode, estimate a load on the control plane based on the number of other UEs receiving signaling messages to transition from non-connected mode to connected mode, and defer a transition of the UE from non-connected mode to connected mode to delay a transfer of the data from the UE to the mobile network over the radio interface when the load on the control plane exceeds a threshold.

In another embodiment, the processor is further configured to cause the UE to transition from non-connected mode to connected mode when the load on the control plane does not exceed the threshold, and initiate the transfer of the data from the UE to the mobile network over the radio interface.

In another embodiment, the data buffered for the applications comprises background data.

In another embodiment, the data buffered for at least one of the applications comprises Machine-Type Communications (MTC) data.

In another embodiment, the processor is further configured to cause the UE to monitor paging messages to determine the number of other UEs identified in the paging messages.

In another embodiment, the processor is further configured to cause the UE to monitor random access messages to determine the number of other UEs receiving random access response messages.

In another embodiment, the processor is configured to cause the UE to determine the number of other UEs receiving signaling messages over a first time interval, and the threshold is a percentage of an average load on the control plane over a second time interval that is longer than the first time interval.

Another embodiment comprises a method of operating a UE to communicate with a mobile network over a radio interface. The method comprises identifying data buffered for one or more applications running on the UE while the UE is in non-connected mode, determining (while the UE is in non-connected mode) a number of other UEs receiving signaling messages on a control plane to transition from non-connected mode to connected mode, estimating a load on the control plane based on the number of other UEs receiving signaling messages to transition from non-connected mode to connected mode, and deferring a transition of the UE from non-connected mode to connected mode to delay a transfer of the data from the UE to the mobile network over the radio interface when the load on the control plane exceeds a threshold.

In another embodiment, the method further comprises transitioning the UE from non-connected mode to connected mode when the load on the control plane does not exceed the threshold, and initiating the transfer of the data from the UE to the mobile network over the radio interface.

In another embodiment, determining the number of other UEs receiving signaling messages on the control plane to transition from non-connected mode to connected mode comprises monitoring paging messages to determine the number of other UEs identified in the paging messages.

In another embodiment, determining the number of other UEs receiving signaling messages on the control plane to transition from non-connected mode to connected mode comprises monitoring random access messages to determine the number of other UEs receiving random access response messages.

In another embodiment, determining the number of other UEs receiving signaling messages on the control plane comprises determining the number of other UEs receiving signaling messages over a first time interval, and the threshold is a percentage of an average load on the control plane over a second time interval that is longer than the first time interval.

Another embodiment comprises a non-transitory computer readable medium embodying programmed instructions executed by a processor. The instructions direct the processor to implement a method of operating a UE configured to communicate with a mobile network over a radio interface. The method comprises identifying data buffered for one or more applications running on the UE while the UE is in non-connected mode, determining (while the UE is in non-connected mode) a number of other UEs receiving signaling messages on a control plane to transition from non-connected mode to connected mode, estimating a load on the control plane based on the number of other UEs receiving signaling messages to transition from non-connected mode to connected mode, and deferring a transition of the UE from non-connected mode to connected mode to delay a transfer of the data from the UE to the mobile network over the radio interface when the load on the control plane exceeds a threshold.

Another embodiment comprises UE configured to communicate with a mobile network over a radio interface. The UE comprises a means for identifying data buffered for one or more applications running on the UE while the UE is in non-connected mode, a means for determining a number of other UEs receiving signaling messages on a control plane to transition from non-connected mode to connected mode, a means for estimating a load on the control plane based on the number of other UEs receiving signaling messages to transition from non-connected mode to connected mode, and a means for deferring a transition of the UE from non-connected mode to connected mode to delay a transfer of the data from the UE to the mobile network over the radio interface when the load on the control plane exceeds a threshold.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
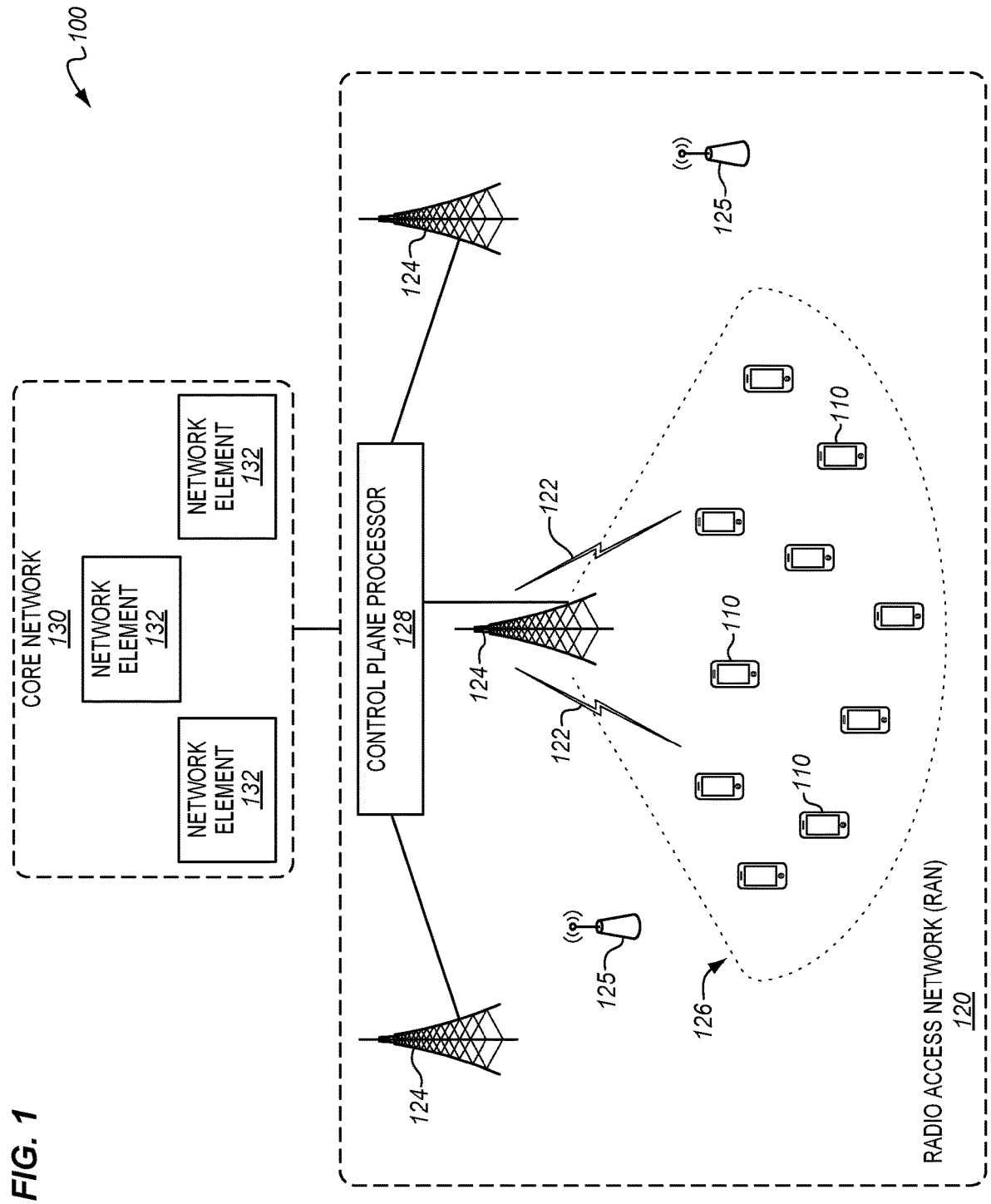
FIG. 1 illustrates a mobile network in an illustrative embodiment.

FIG. 1 illustrates a mobile network 100 in an illustrative embodiment. Mobile network 100 (also referred to as a cellular network) is a type of network where the last link is wireless, and provides voice and/or data services to a plurality of devices. Mobile network 100 may be a Third Generation (3G), a Fourth Generation (4G), and/or a next generation network (e.g., 5G).

Mobile network 100 is illustrated as providing communication services to UEs 110 (along with other UEs not shown). UEs 110 may be enabled for voice services, data services, Machine-to-Machine (M2M) or Machine Type Communications (MTC) services, and/or other services. A UE 110 may be an end user device such as a mobile phone (e.g., smartphone), a tablet or PDA, a computer with a mobile broadband adapter, etc.

Mobile network 100 includes one or more Radio Access Networks (RAN) 120 that communicate with UEs 110 over a radio interface 122. RAN 120 may support Evolved-UMTS Terrestrial Radio Access Network (E-UTRAN) access, Wireless Local Area Network (WLAN) access, fixed access, satellite radio access, new Radio Access Technologies (RAT), etc. As an example, RAN 120 may comprise an E-UTRAN or Next Generation RAN (NG-RAN) that includes one or more base stations 124 that are dispersed over a geographic area. A base station 124 may comprise an entity that uses radio communication technology to communicate with a UE on the licensed spectrum, and interface the UE with a core network. Base stations 124 in an E-UTRAN are referred to as Evolved-NodeBs (eNodeB). Base stations 124 in an NG-RAN are referred to as gNodeBs (NR base stations) and/or ng-eNodeBs (LTE base stations supporting a 5G Core Network). As another example, RAN 120 may comprise a WLAN that includes one or more Wireless Access Points (WAP) 125. A WLAN is a network in which a UE is able to connect to a Local Area Network (LAN) through a wireless (radio) connection. A WAP 125 is a node that uses radio communication technology to communicate with a UE over the unlicensed spectrum, and provides the UE access to a core network. One example of WAP 125 is a WiFi access point that operates on the 2.4 GHz or 5 GHz radio bands. The term "base station" as used herein may refer to an eNodeB, a gNodeB, and ng-eNodeBs, a WAP, etc.

In this embodiment, RAN 120 also includes one or more control plane processors 128. A control plane processor 128 represents equipment that processes signaling messages on the control plane. For example, a control plane processor 128 may process the signaling messages that are used to transition a UE 110 from non-connected mode (e.g., idle mode) to connected mode, as will be described in more detail below. Control plane processor 128 may be implemented as part of a base station 124 (e.g., eNodeB), or may be equipment shared by a plurality of base stations 124.

UEs 110 are able to attach to cell 126 of RAN 120 to access a core network 130. RAN 120 therefore represents the radio interface between UEs 110 and core network 130. Core network 130 is the central part of mobile network 100 that provides various services to customers who are connected by RAN 120. One example of core network 130 is the Evolved Packet Core (EPC) network as suggested by the 3GPP for LTE. Another example of core network 130 is a 5G core network as suggested by the 3GPP. Core network 130 includes network elements 132, which may comprise servers, devices, apparatus, or equipment (including hardware) that provide services for UEs 110. Network elements 132, in an EPC network, may comprise a Mobility Management Entity (MME), a Serving Gateway (S-GW), a Packet Data Network Gateway (P-GW), etc. Network elements 132, in a 5G network, may comprise an Access and Mobility Management Function (AMF), a Session Management Function (SMF), a Policy Control Function (PCF), an Application Function (AF), a User Plane Function (UPF), etc.

Figure 2:
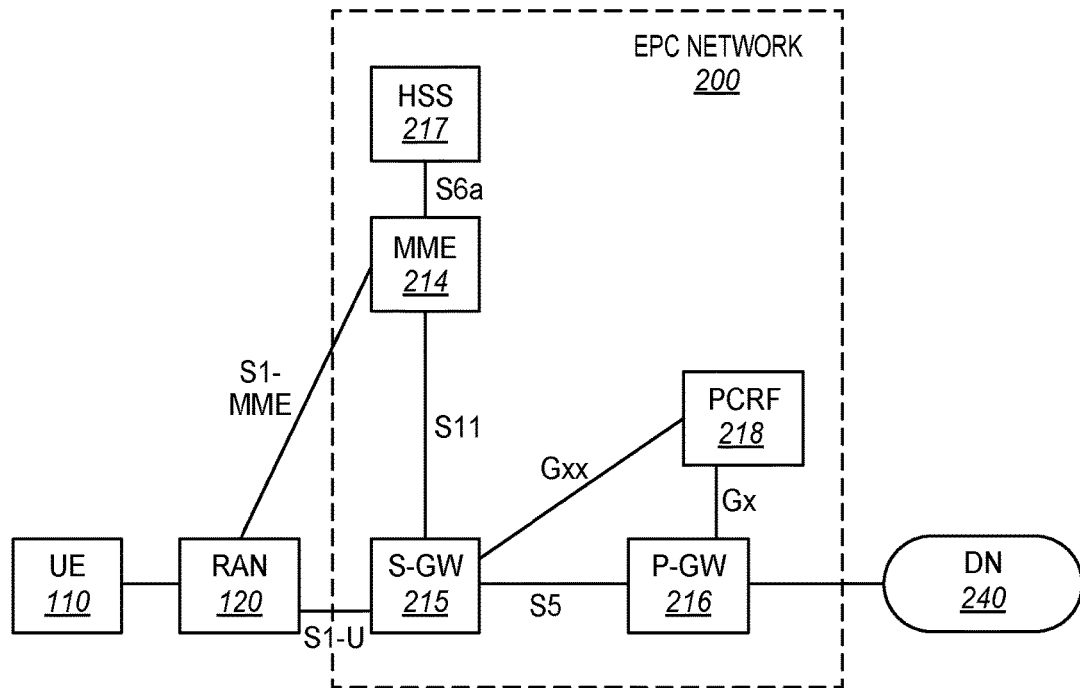
FIG. 2 illustrates an Evolved Packet Core (EPC) network.

FIG. 2 illustrates an Evolved Packet Core (EPC) network 200, which is the core network for LTE. EPC network 200 includes a Mobility Management Entity (MME) 214, a Serving Gateway (S-GW) 215, a Packet Data Network Gateway (P-GW) 216, a Home Subscriber Server (HSS) 217, and a Policy and Charging Rules Function (PCRF) 218, but may include other elements not shown, such as IP Multimedia Subsystem (IMS) Application Servers. Within the EPC network 200, the user data (also referred to as the "user plane") and the signaling (also referred to as the "control plane") are separated. MME 214 handles the control plane within EPC network 200. For instance, MME 214 handles the signaling related to mobility and security for E-UTRAN access. MME 214 is responsible for tracking and paging UE 110 in idle mode. S-GW 215 and P-GW 216 handle the user plane. S-GW 215 and P-GW 216 transport data traffic between UE 110 and external data networks 240 (DN or Packet Data Network (PDN)). S-GW 215 is the point of interconnect between the radio-side and EPC network 200, and serves UE 110 by routing incoming and outgoing IP packets. S-GW 215 is also the anchor point for the intra-LTE mobility (i.e., in case of handover between eNodeBs), and between LTE and other 3GPP accesses. P-GW 216 is the point of interconnect between EPC network 200 and external data networks 240 (i.e., point of ingress or egress for data network 240), and routes packets to and from data network 240. HSS 217 is a database that stores user-related and subscriber-related information. PCRF 218 provides a Policy and Charging Control (PCC) solution in EPC network 200, and is a node or entity of EPC network 200 that formulates PCC rules for services requested by an end user.

MME 214 connects to RAN 120 (i.e., eNodeB) through the S1-MME interface, and S-GW 215 connects to RAN 120 through the S1-U interface. MME 214 connects to S-GW 215 through the S11 interface, and connects to HSS 217 through the S6a interface. PCRF 218 connects to P-GW 216 through the Gx interface, which provides the transfer of policy and charging rules from PCRF 218 to a Policy and Charging Enforcement Function (PCEF) in P-GW 216. PCRF 218 connects to S-GW 215 through the Gxx interface, and S-GW 215 connects to P-GW 216 through the S5 interface.

Figure 3:
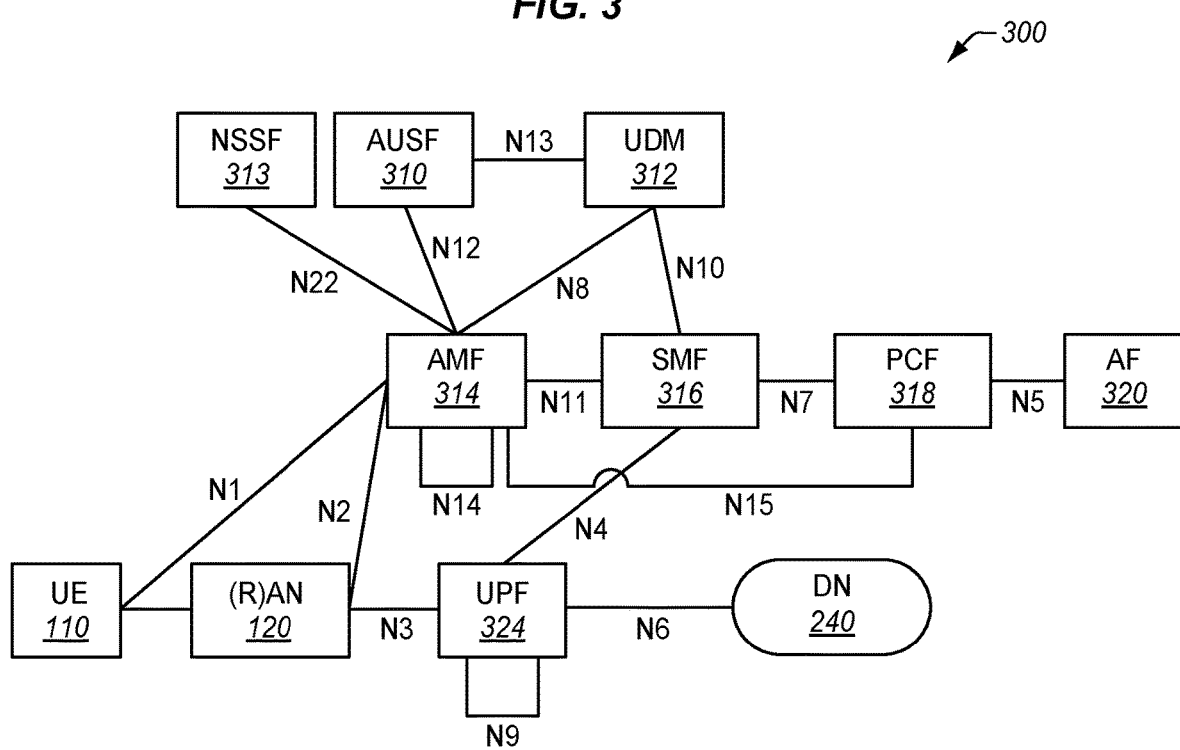
FIG. 3 illustrates a non-roaming architecture of a next generation network.

FIG. 3 illustrates a non-roaming architecture 300 of a next generation network. The architecture in FIG. 3 is a reference point representation, as is further described in 3GPP TS 23.501 (v16.1.0), which is incorporated by reference as if fully included herein. Architecture 300 is comprised of Network Functions (NF) for a core network, and the network functions for the control plane are separated from the user plane. The control plane of the core network includes an Authentication Server Function (AUSF) 310, a Unified Data Management (UDM) 312, a Network Slice Selection Function (NSSF) 313, an Access and Mobility Management Function (AMF) 314, a Session Management Function (SMF) 316, a Policy Control Function (PCF) 318, and an Application Function (AF) 320. The user plane of the core network includes one or more User Plane Functions (UPF) 324 that communicate with data network 240. UE 110 is able to access the control plane and the user plane of the core network through (R)AN 120.

AUSF 310 is configured to support authentication of UE 110. UDM 312 is configured to store subscription data/information for UE 110. UDM 312 may store three types of user data: subscription, policy, and session-related context (e.g., UE location). AMF 314 is configured to provide UE-based authentication, authorization, mobility management, etc. SMF 316 is configured to provide the following functionality: session management (SM), UE Internet Protocol (IP) address allocation and management, selection and control of UPF(s), termination of interfaces towards PCF 318, control part of policy enforcement and Quality of Service (QoS), lawful intercept, termination of SM parts of NAS messages, Downlink Data Notification (DNN), roaming functionality, handle local enforcement to apply QoS for Service Level Agreements (SLAs), charging data collection and charging interface, etc. If UE 110 has multiple sessions, different SMFs may be allocated to each session to manage them individually and possibly provide different functionalities per session. PCF 318 is configured to support a unified policy framework to govern network behavior, and to provide policy rules to control plane functions for QoS enforcement, charging, access control, traffic routing, etc. AF 320 provides information on a packet flow to PCF 318. Based on the information, PCF 318 is configured to determine policy rules about mobility and session management to make AMF 314 and SMF 316 operate properly.

UPF 324 supports various user plane operations and functionalities, such as packet routing and forwarding, traffic handling (e.g., QoS enforcement), an anchor point for Intra-RAT/Inter-RAT mobility (when applicable), packet inspection and policy rule enforcement, lawful intercept (UP collection), traffic accounting and reporting, etc. Data network 240 is not part of the core network, and provides Internet access, operator services, 3rd party services, etc. For instance, the International Telecommunication Union (ITU) has classified 5G mobile network services into three categories: Enhanced Mobile Broadband (eMBB), Ultra-reliable and Low-Latency Communications (uRLLC), and Massive Machine Type Communications (mMTC) or Massive Internet of Things (MIoT). eMBB focuses on services that have high bandwidth requirements, such as HD videos, Virtual Reality (VR), and Augmented Reality (AR). uRLLC focuses on latency-sensitive services, such as automated driving and remote management. mMTC and MIoT focuses on services that include high requirements for connection density, such as smart city and smart agriculture. Data network 240 may be configured to provide these and other services.

Architecture 300 includes the following reference points. The N1 reference point is implemented between UE 110 and AMF 314. The N2 reference point is implemented between (R)AN 120 and AMF 314. The N3 reference point is implemented between (R)AN 120 and UPF 324. The N4 reference point is implemented between the SMF 316 and UPF 324. The N5 reference point is implemented between PCF 318 and AF 320. The N6 reference point is implemented between UPF 324 and data network 240. The N7 reference point is implemented between the SMF 316 and PCF 318. The N8 reference point is implemented between UDM 312 and AMF 314. The N9 reference point is implemented between two UPFs 324. The N10 reference point is implemented between UDM 312 and SMF 316. The N11 reference point is implemented between AMF 314 and SMF 316. The N12 reference point is implemented between AMF 314 and AUSF 310. The N13 reference point is implemented between UDM 312 and AUSF 310. The N14 reference point is implemented between two AMFs. The N15 reference point is implemented between PCF 318 and AMF 314 in the case of a non-roaming scenario. The N22 reference point is implemented between NSSF 313 and AMF 314.

Figure 4:
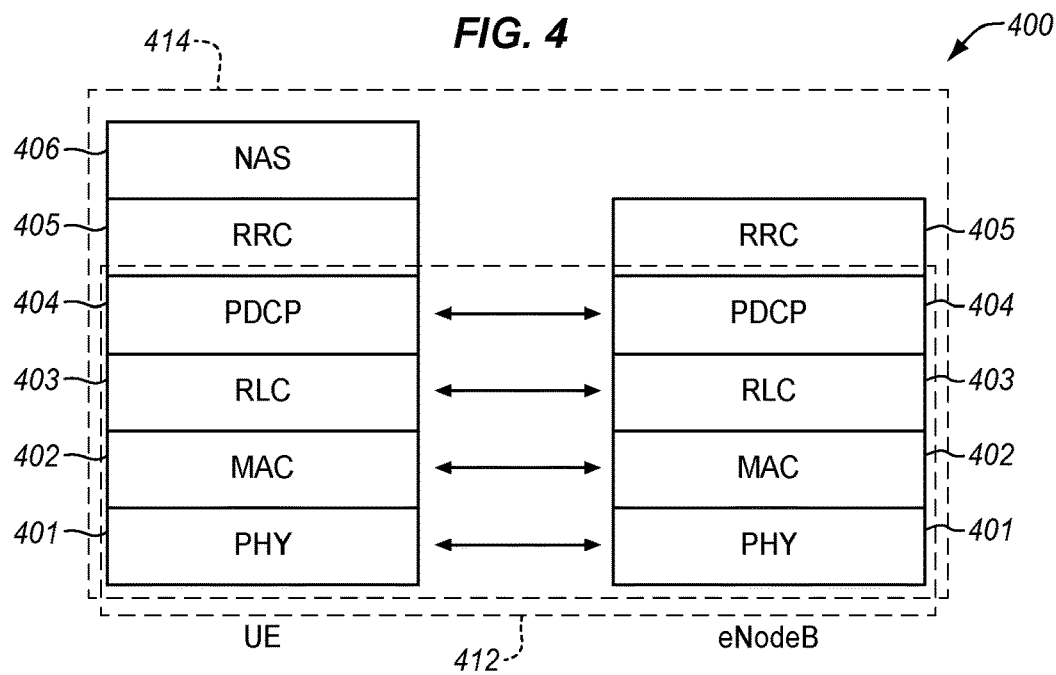
FIG. 4 illustrates a radio protocol stack.

FIG. 4 illustrates a radio protocol stack 400, such as for radio interface 122. As described herein, the user plane 412 comprises a set of protocols used to transfer the actual user data through a network, and the control plane 414 comprises protocols used to control and establish the user connections and bearers within the network. For the user plane 412 and the control plane 414, radio protocol stack 400 includes the physical (PHY) layer 401, the Medium Access Control (MAC) layer 402, the Radio Link Control (RLC) layer 403, and the Packet Data Convergence Protocol (PDCP) layer 404. The control plane 414 additionally includes the Radio Resource Control (RRC) layer 405 and the Non-Access Stratum (NAS) layer 406.

The physical layer 401 carries all information from the MAC transport channels over the radio interface. Data and signaling messages are carried on physical channels between the different levels of physical layer 401. The physical channels are divided into physical data channels and physical control channels. The physical data channels may include the Physical Downlink Shared Channel (PDSCH), the Physical Broadcast Channel (PBCH), the Physical Multicast Channel (PMCH), the Physical Uplink Shared Channel (PUSCH), and the Physical Random Access Channel (PRACH). The physical control channels may include the Physical Control Format Indicator Channel (PCFICH), the Physical Hybrid ARQ Indicator Channel (PHICH), the Physical Downlink Control Channel (PDCCH), and the Physical Uplink Control Channel (PUCCH).

The MAC layer 402 is responsible for mapping between logical channels and transport channels, multiplexing of MAC SDUs from one or different logical channels onto transport blocks (TB) to be delivered to the physical layer on transport channels, de-multiplexing of MAC SDUs from one or different logical channels from transport blocks (TB) delivered from the physical layer on transport channels, scheduling information reporting, error correction through HARQ, priority handling between UEs by means of dynamic scheduling, priority handling between logical channels of one UE, and logical channel prioritization. The RLC layer 403 is responsible for transfer of upper layer PDUs, error correction through ARQ, and concatenation, segmentation and reassembly of RLC SDUs. The RLC layer 403 is also responsible for re-segmentation of RLC data PDUs, reordering of RLC data PDUs, duplicate detection, RLC SDU discard, RLC re-establishment, and protocol error detection. The PDCP layer 404 is responsible for header compression and decompression of IP data, transfer of data (user plane or control plane), maintenance of PDCP Sequence Numbers (SNs), in-sequence delivery of upper layer PDUs at re-establishment of lower layers, duplicate elimination of lower layer SDUs at re-establishment of lower layers for radio bearers mapped on RLC AM, ciphering and deciphering of user plane data and control plane data, integrity protection and integrity verification of control plane data, timer-based discard, duplicate discarding, etc. The RRC layer 405 is responsible for the broadcast of System Information related to the NAS, broadcast of System Information related to the Access Stratum (AS), paging, establishment, maintenance, and release of an RRC connection between the UE and RAN, security functions including key management, establishment, configuration, maintenance, and release of point-to-point Radio Bearers (RB). The NAS layer 406 represents the highest stratum of the control plane 414 between the UE and the core network (e.g., MME/AMF), and supports the mobility of the UE and the session management procedures to establish and maintain IP connectivity between the UE and the core network.

To access services from a mobile network, a UE performs cell selection by measuring a Received Signal Strength Indicator (RSSI) for a set of channels. The channels having an RSSI over a threshold are considered as candidate cells for the UE. The UE decodes the Primary Synchronization Signal (PSS) and the Secondary Synchronization Signal (SSS) to achieve downlink frame synchronization, and to identify the Physical Layer Cell Identity (PCI) for each of the candidate cells. The UE also receives System Information for each of the cells by decoding the Master Information Block (MIB) and System Information Blocks (SIBs) that are broadcast by the cells over the broadcast channel. The MIB carries physical layer information of a cell that assists the UE in receiving further SIBs (e.g., system bandwidth). The SIBs carry other system information, such as the Public Land Mobile Network (PLMN) ID, cell ID, Tracking Area Code (TAC), cell barring information (e.g., whether a UE is barred from camping on a cell), etc. The UE then selects one of the candidate cells based on its cell selection criteria, and camps on the selected cell. At this point, the UE is synchronized with the mobile network in the downlink (DL) direction.

Figure 5:
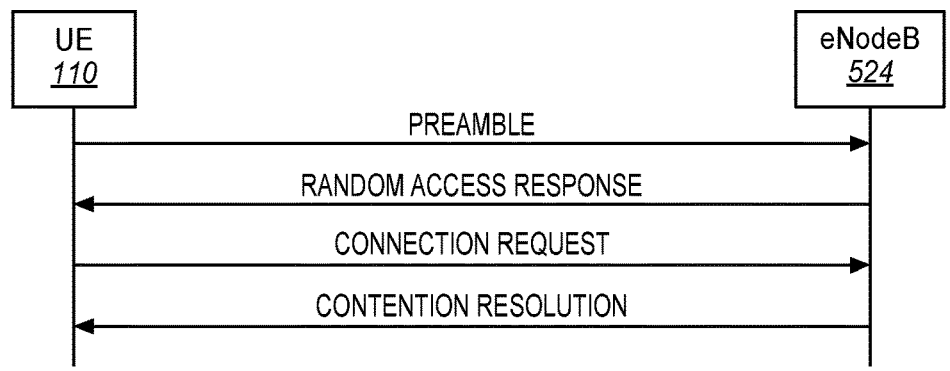
FIG. 5 is a message diagram illustrating a contention-based Random Access procedure.

To synchronize with the mobile network in the uplink (UL) direction, the UE performs a Random Access procedure (RAP) over the PRACH. The Random Access procedure may occur upon initial access by the UE, during an RRC connection re-establishment procedure, upon handover, when UL synchronization is lost, when the UE does not have any PUCCH resources available for a scheduling request, when timing advance is needed, etc. FIG. 5 is a message diagram illustrating a contention-based Random Access procedure. This Random Access procedure includes the exchange of four messages between a UE 110 and an eNodeB 524 (which is one example of a base station 124 as in FIG. 1). For message-1, UE 110 randomly selects one of the 64 available RACH preambles for the cell, and sends the preamble to eNodeB 524. The RACH preamble is a specific pattern or signature, and the preamble value differentiates requests coming from different devices. For message-2, eNodeB 524 calculates an identity for UE 110 (i.e., a Random Access Radio Network Temporary Identity (RA-RNTI)) from the RACH preamble, and sends a Random Access Response (RAR) to UE 110 on the DL-SCH (Downlink Shared Channel) addressed to the RA-RNTI. The RAR includes a temporary Cell Radio Network Temporary Identity (C-RNTI) given by eNodeB 524 for further communication, a timing advance value so that UE 110 may change its timing to compensate for the round trip delay caused the distance between UE 110 and eNodeB 524, and an uplink grant resource so that UE 110 can use the UL-SCH (Uplink Shared Channel). For message-3, UE 110 sends an RRC connection request message to eNodeB 524 using the UL-SCH. The RRC connection request message includes an identity for UE 110 (e.g., Temporary Mobile Subscriber Identity (TMSI) or Random Value). The TMSI is used if UE 110 has previously connected to the network, and the random value is used when UE 110 is initially connecting to the network. The RRC connection request message also includes a connection establishment cause, which indicates the reason why UE 110 needs to connect to the network. For message-4, eNodeB 524 responds to UE 110 with a contention resolution message acknowledging successful receipt of the RRC connection request message. The contention resolution message is addressed towards the TMSI value or random number, and includes a new C-RNTI which is used for further communication.

Figure 6:
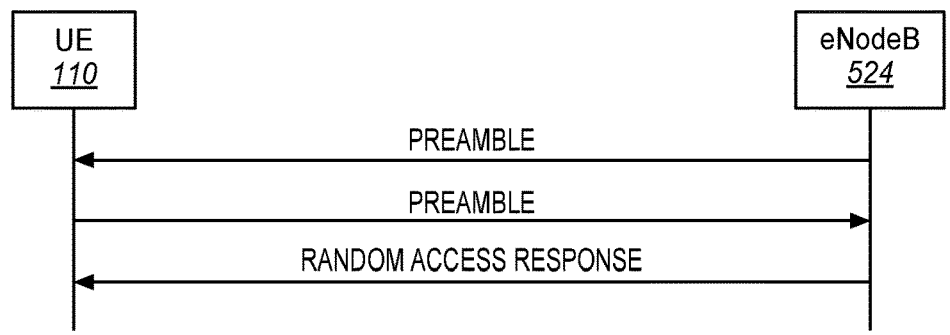
FIG. 6 is a message diagram illustrating a contention-free Random Access procedure.

FIG. 6 is a message diagram illustrating a contention-free Random Access procedure. Instead of UE 110 selecting one of the 64 available RACH preambles as in the contention-based example, eNodeB 524 actually assigns a preamble to UE 110. Thus, eNodeB 524 sends the preamble to UE 110. For message-1, UE 110 sends the preamble back to eNodeB 524. eNodeB 524 calculates the identity for UE 110 (i.e., RA-RNTI) from the RACH preamble. For message-2, eNodeB 524 sends a Random Access Response (RAR) to UE 110 on the DL-SCH addressed to the RA-RNTI. The RAR includes a temporary C-RNTI given by eNodeB 524 for further communication, a timing advance value so that UE 110 may change its timing to compensate for the round trip delay caused the distance between UE 110 and eNodeB 524, and an uplink grant resource so that UE 110 can use the UL-SCH.

After the Random Access procedure, the UE 110 needs to establish an RRC connection with RAN 120 (e.g., eNodeB) to access services from mobile network 100. The RRC layer controls communications between a UE and an eNodeB at the radio interface. The RRC is the highest layer in the control plane of the Access Stratum (AS). The RRC also transfers NAS messages, which is located above the RRC layer. NAS messages are used to control communications between a UE and the core network. The RRC layer performs the following functions: broadcast of system information, paging, establishment/release of an RRC connection, transfer of NAS information, AS security configuration, transfer of UE radio access capability, measurement configuration and reporting and mobility control. The RRC protocol is described in 3GPP TS 36.331 (v15.6.0), which is incorporated by reference as if fully included herein.

Figure 7:
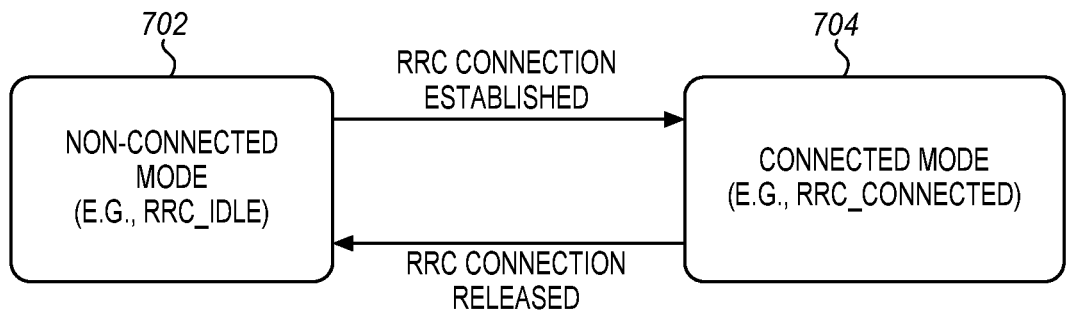
FIG. 7 illustrates an RRC state machine.

The operation of the RRC is guided by a state machine, which defines the specific states or modes of UE 110. FIG. 7 illustrates an RRC state machine. An RRC connection transitions between non-connected mode 702 (e.g., RRC_IDLE) and connected mode 704 (e.g., RRC_CONNECTED). There may be additional modes, states, or stages, such as an inactive mode (e.g., RRC_INACTIVE), additional connected modes, etc. But for the purposes of this discussion, UE 110 is considered as being in connected mode 704 or non-connected mode 702. When UE 110 is in connected mode 704, an RRC connection is established and UE 110 is able to transfer data to and receive data from an eNodeB. With an RRC connection established, a Signaling Radio Bearer 1 (SRB1) is established between UE 110 and an eNodeB. A signaling radio bearer is defined as a radio bearer that is only used for transmission of RRC and NAS messages. There are three SRB types defined for E-UTRA: SRB0, SRB1, and SRB2. SRB0 is used to transport RRC messages associated with the common control logical channel. SRB1 is used to transport RRC messages including piggybacked NAS messages associated with a dedicated control logical channel. SRB2 is used to transport NAS messages using a dedicated control logical channel, but has a lower priority than SRB1 and is configured after security activation. One or more dedicated Data Radio Bearers (DRBs) may also be established when UE 110 is in connected mode 704, such as after a NAS attach procedure.

During a period of inactivity, for example, UE 110 may transition to non-connected mode 702, such as to reduce UE power consumption. Non-connected mode 702 may also be referred to as idle mode. The number of processes that UE 110 is required to perform in non-connected mode 702 is significantly smaller than in connected mode. For example, UE 110 in non-connected mode 702 may be active for a short time to perform a limited number of processes, such as monitoring for incoming calls and measurements for mobility, but generally stays inactive most of the time. When UE 110 is in non-connected mode 702, an RRC connection is not established for UE 110. In other words, an RRC connection has not been established (e.g., in a power-on scenario), has been released, has been suspended, etc., and an SRB1 is not established between UE 110 and an eNodeB. The presence of UE 110 may not be known at the cell level when in non-connected mode 702 because eNodeBs do not have any context for the UE 110. The location of UE 110 in non-connected mode 702 is known to core network 130 at the level of tracking areas.

Figure 8:
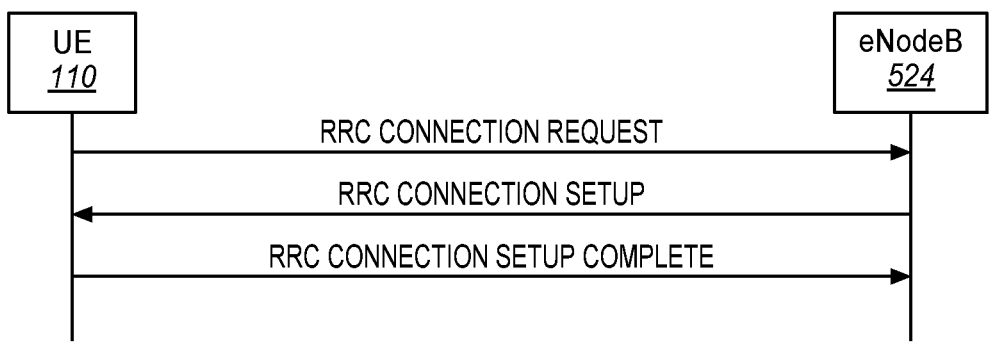
FIG. 8 is a message diagram illustrating RRC connection setup.

FIG. 8 is a message diagram illustrating RRC connection setup. The RRC Connection Establishment procedure is initiated when the upper layers request the establishment of a signaling connection when UE 110 is in idle mode. UE 110 sends an RRC Connection Request message to eNodeB 524, such as on SRB0. eNodeB 524 performs admission control to determine if an RRC connection is allowed for UE 110. If so, eNodeB 524 sends an RRC Connection Setup message to UE 110. The RRC Connection Setup message includes RLC and MAC parameters to establish the SRB1. UE 110 applies the configuration from the RRC Connection Setup message, and transitions into connected mode. UE 110 then sends an RRC Connection Setup Complete message to eNodeB 524.

Figure 9:
FIG. 9 is a message diagram illustrating RRC connection release.

FIG. 9 is a message diagram illustrating RRC connection release. The release of an RRC connection is normally initiated by the RAN 120 when UE 110 is in connected mode. When eNodeB 524 detects that UE 110 does not have any traffic to send and receive during a defined period of time, usually referred to an inactivity timer (e.g., 10 sec, 20 sec, etc.), eNodeB 524 may initiate procedures to release an RRC connection. eNodeB 524 transmits an RRC connection release message to UE 110 to transition UE 110 to non-connected or idle mode. In this state, UE 110 doesn't have any connectivity to core network 130 as existing connections, such as SRBs and DRBs, are removed. Also, context information relating to UE 110 may be removed from RAN 120. However, if UE 110 transitions to another mode other than idle (e.g., inactivity mode), then context information may be maintained in RAN 120.

While in non-connected or idle mode, UE 110 will continue to perform cell reselection and Tracking Area Updates (TAU). UE 110 will also periodically monitor downlink channels of the selected cell for paging messages. Paging messages are initiated by core network 130 to locate an idle UE when there is DL traffic being buffered. To monitor for paging messages, UE 110 synchronizes with RAN 120 in the DL direction, and decodes SIBs to read DL communications from the cell. If DL data is received for UE 110 (that is idle), core network 130 will buffer the data and reestablish bearer connections with UE 110. Core network 130, such as through an MME, AMF, or the like, will initiate paging of the cells in the tracking area to determine the cell in which UE 110 is located. Base stations 124 in the tracking area will send the paging messages to UE 110 during the UE's listening intervals.

One or more of UEs 110 (and other UEs not shown) may need to exit non-connected or idle mode, such as when new DL data is buffered in core network 130, or new UL data is buffered in the UE 110. To transition from non-connected mode to connected mode, UEs 110 will UL-synchronize with their cell using the Random Access procedures, and attempt to establish an RRC connection using RRC Connection Establishment procedures. The control plane 414 may become overloaded when a large number of UEs 110 perform Random Access procedures and RRC Connection Establishment procedures in a cell. According to the embodiments described herein, a UE 110 may delay in exiting non-connected mode when the control plane is at or near an overload condition. As an overview, a UE 110 monitors the control plane 414 to determine the number of signaling messages that are directed to other UEs in the cell, and estimates a load on the control plane. When the estimated load is above a threshold, the UE 110 delays a procedure for exiting non-connected mode. Thus, the UE 110 postpones sending of signaling messages on the control plane 414, which would be required for the UE 110 to exit non-connected mode, to avoid exacerbating a possible overload condition on the control plane 414.

Figure 10:
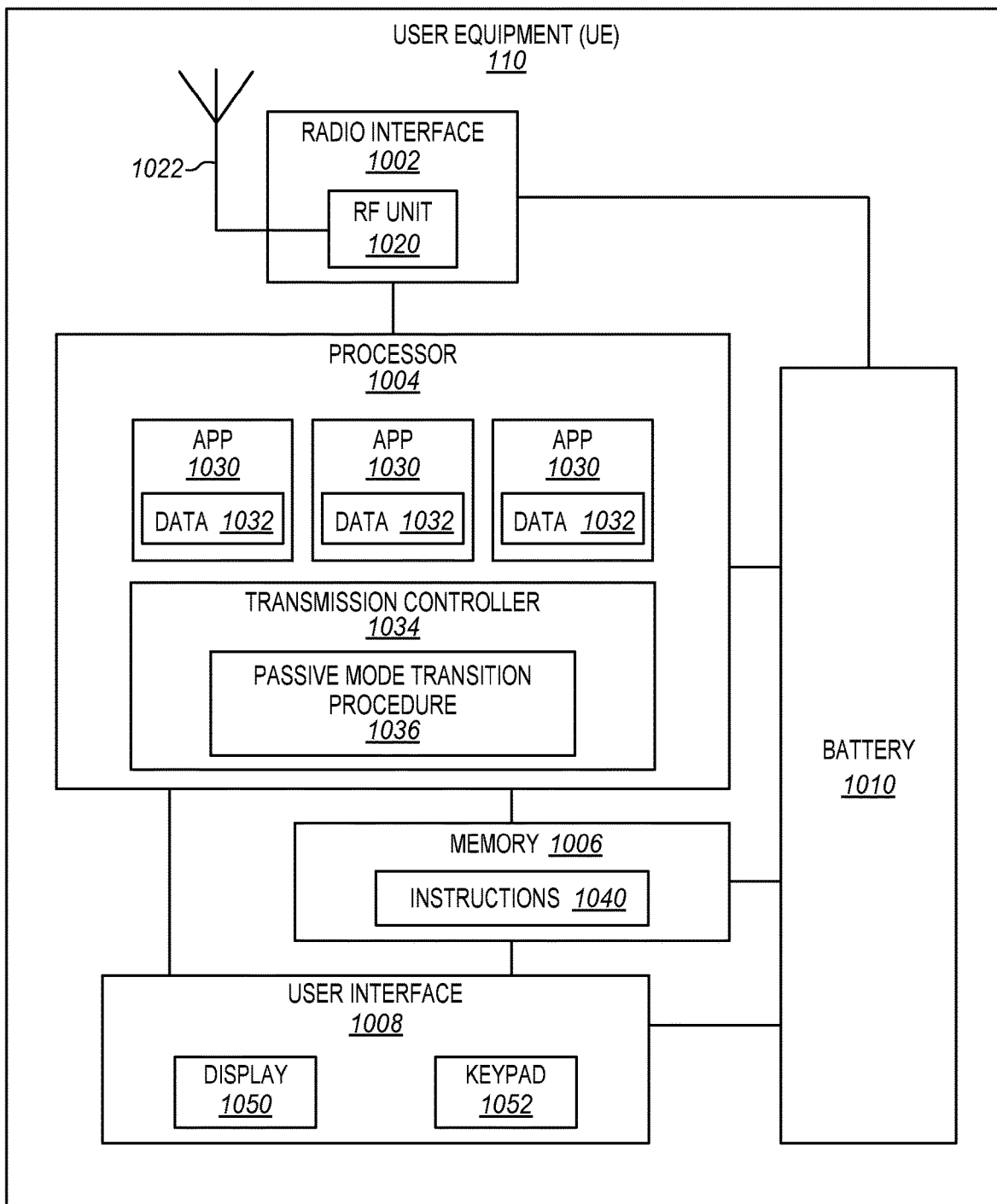
FIG. 10 is a block diagram of a UE in an illustrative embodiment.

FIG. 10 is a block diagram of a UE 110 in an illustrative embodiment. UE 110 includes a radio interface component 1002, one or more processors 1004, a memory 1006, a user interface component 1008, and a battery 1010. Radio interface component 1002 is a hardware component that represents the local radio resources of UE 110, such as an RF unit 1020 (e.g., transceiver) and one or more antennas 1022, used for wireless communications with a base station (e.g., base station 124) via radio or "over-the-air" signals. Processor 1004 represents the internal circuitry, logic, hardware, software, etc., that provides the functions of UE 110. Processor 1004 may be configured to execute instructions 1040 for software that are loaded into memory 1006. Processor 1004 may comprise a set of one or more processors or may comprise a multi-processor core, depending on the particular implementation. Memory 1006 is a computer readable storage medium for data, instructions 1040, applications, etc., and is accessible by processor 1004. Memory 1006 is a hardware storage device capable of storing information on a temporary basis and/or a permanent basis. Memory 1006 may comprise a random-access memory, or any other volatile or non-volatile storage device. User interface component 1008 is a hardware component for interacting with an end user. For example, user interface component 1008 may include a display 1050, screen, touch screen, or the like (e.g., a Liquid Crystal Display (LCD), a Light Emitting Diode (LED) display, etc.). User interface component 1008 may include keyboard or keypad 1052, a tracking device (e.g., a trackball or trackpad), a speaker, a microphone, etc. UE 110 may include various other components not specifically illustrated in FIG. 10.

Processor 1004 implements one or more applications 1030. These applications 1030 may access DL data through RAN 120 and core network 130, and may also generate UL data 1032 for transfer to a destination through RAN 120 and core network 130. The UL data 1032 may be buffered or queued by the applications 1030, in processor 1004, in memory 1006, etc. As described above, the UL data 1032 may comprise unattended or background data that is generated by applications 1030. Background data is data that is generated by an application 1030 even when a user is not actively using the application 1030 (i.e., even if the screen is dark). For example, an application 1030 may request updates, news feeds, weather information, etc., while running in the background. UL data 1032 may comprise MTC data or other types of data.

Processor 1004 also implements a transmission controller 1034 that is configured to control the transfer of UL data 1032 (and other UL data) to RAN 120. In this embodiment, transmission controller 1034 implements a passive mode transition procedure 1036 when handling the transfer of UL data 1032 to the network. For example, when UE 110 is in idle mode, transmission controller 1034 may check the load on the control plane 414 before transitioning UE 110 to connected mode to transfer the UL data 1032, as is described in more detail below.

Figure 11:
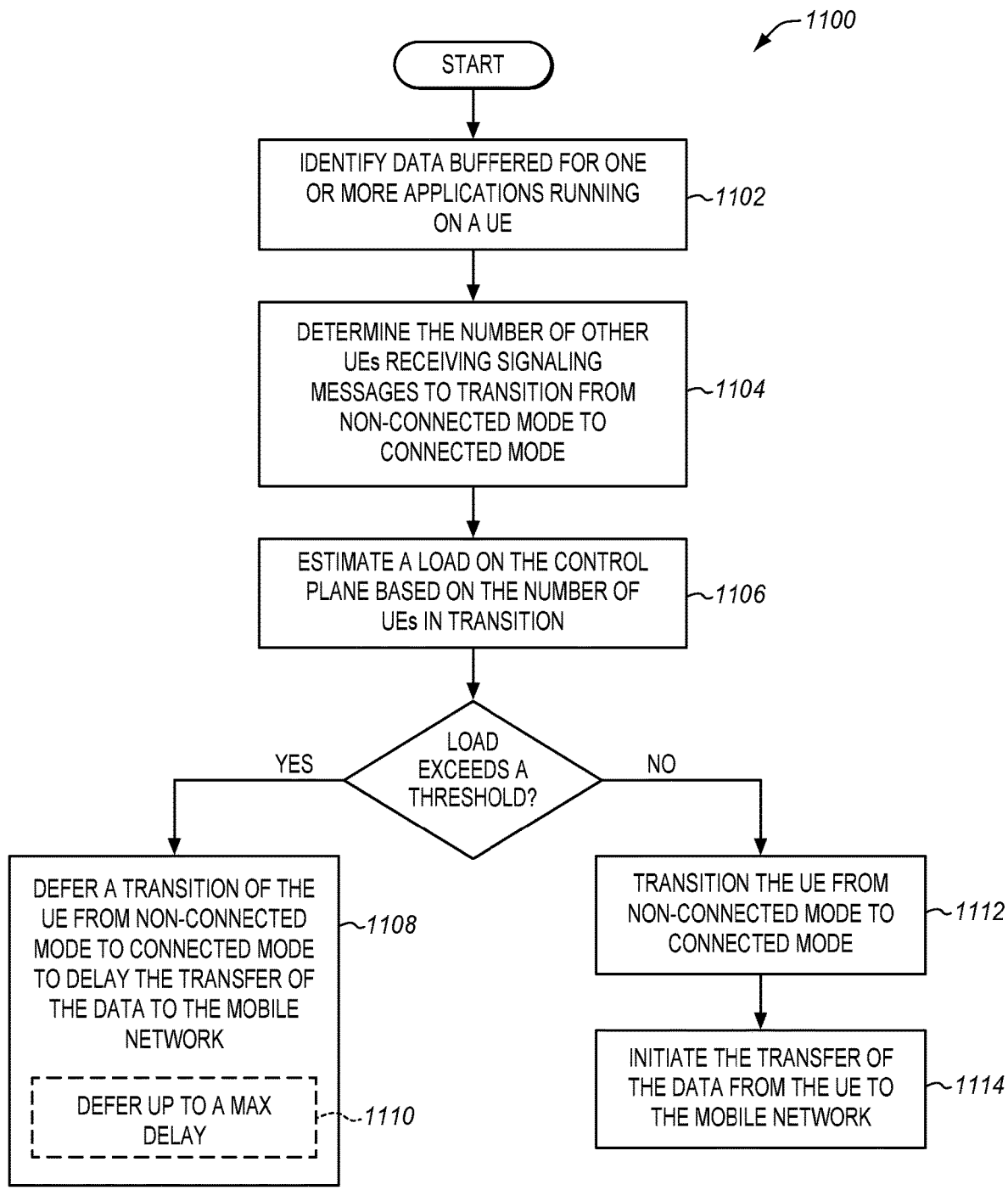
FIG. 11 is a flow chart illustrating a method of handling a data transfer from a UE to a network in an illustrative embodiment.

FIG. 11 is a flow chart illustrating a method 1100 of handling a data transfer from UE 110 to a network in an illustrative embodiment. The steps of method 1100 will be described with reference to UE 110 in FIG. 10, but those skilled in the art will appreciate that method 1100 may be performed in other networks or architectures. Also, the steps of the flow charts described herein are not all inclusive and may include other steps not shown, and the steps may be performed in an alternative order.

For this embodiment, UE 110 is in non-connected mode (e.g., idle mode), and does not have an RRC connection with RAN 120 (see FIG. 1). Transmission controller 1034 of UE 110 identifies data 1032 buffered for one or more applications 1030 running on UE 110 (step 1102). For example, applications 1030 may send data transfer requests to transmission controller 1034 to transfer data 1032 to mobile network 100. Transmission controller 1034 performs the passive mode transition procedure 1036 to send the data 1032 to mobile network 100. For the passive mode transition procedure 1036, transmission controller 1034 monitors the control plane 414 before transitioning to connected mode, such as over a time interval (e.g., one second). Transmission controller 1034 determines the number of other UEs receiving signaling messages (or UE connection initiation messages) on control plane 414 to transition from non-connected mode to connected mode (step 1104) over that time interval. The signaling messages may provide information on how many other UEs are present in a cell, and/or how many other UEs are also attempting to transition from non-connected mode to connected mode. Transmission controller 1034 estimates a load on the control plane 414 based on the number of other UEs in transition (step 1106). Transmission controller 1034 may estimate the load on the control plane 414 during the last time interval (e.g., one second). The estimated load on control plane 414 may represent the load on control plane processor 128 (see FIG. 1) in processing signaling messages to transition UEs from non-connected mode to connected mode. Transmission controller 1034 may then use the estimated load on the control plane 414 to determine whether or not to transition UE 110 to connected mode in order to transfer the buffered data 1032 to mobile network 100.

More particularly, when the load on the control plane 414 exceeds a threshold, transmission controller 1034 defers a transition of UE 110 from non-connected mode to connected mode to delay the transfer of the data 1032 to mobile network 100 over the radio interface 122 (step 1108). In other words, transmission controller 1034 will delay in initiating Random Access procedures and RRC Connection Establishment procedures in order to establish an RRC connection with RAN 120. Transmission controller 1034 may defer the transition of UE 110 from non-connected mode to connected mode up to a maximum delay (optional step 1110), which may be set by the network operator. For example, transmission controller 1034 may defer the transition for a number of time intervals (e.g., one, two, three, etc.) up to the maximum delay.

The threshold used by transmission controller 1034 may be set as desired. In one embodiment, the threshold may be a percentage of an average load on the control plane 414 over a longer time interval (i.e., longer than the last time interval set for monitoring). For example, transmission controller 1034 may monitor in time intervals of one second to estimate the load on the control plane 414. Transmission controller 1034 may also monitor over a longer time interval, such as ten seconds for example, to determine an average load on the control plane 414 (e.g., an average number of UE's transitioning to connected mode per second). Transmission controller 1034 may therefore identify the threshold to be a percentage (e.g., 200%, 300%, 400%, etc.) of the average load. For instance, if the number of UE's transitioning to connected mode over the last time interval is found to be more than 400% of the average number of UE connection initiations per second over the last ten seconds, then transmission controller 1034 makes a decision that the UE 110 should wait to exit non-connected mode at least until the next time interval (i.e., defer for at least one second).

When the load on the control plane 414 does not exceed the threshold, transmission controller 1034 transitions UE 110 from non-connected mode to connected mode (step 1112). To do so, transmission controller 1034 initiates Random Access procedures and RRC Connection Establishment procedures to establish an RRC connection. Transmission controller 1034 then initiates the transfer of the data 1032 from UE 110 to mobile network 100 over the radio interface 122 (step 1114).

Figure 12:
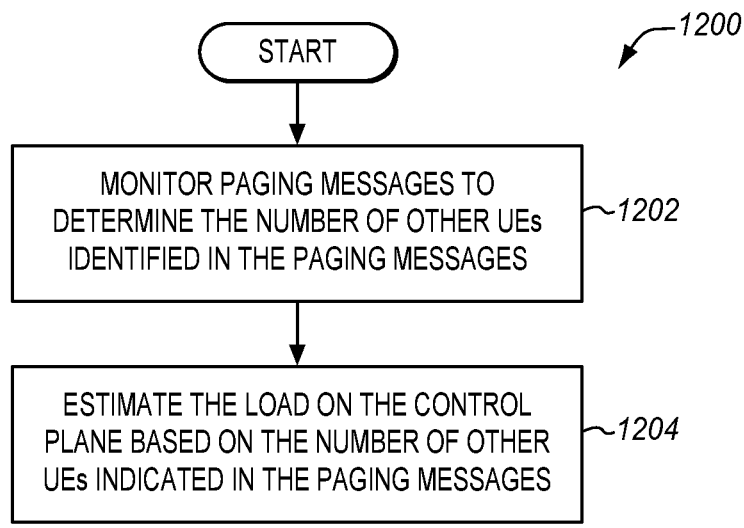
FIG. 12 is a flow chart illustrating a method of estimating a load on the control plane in an illustrative embodiment.
Figure 13:
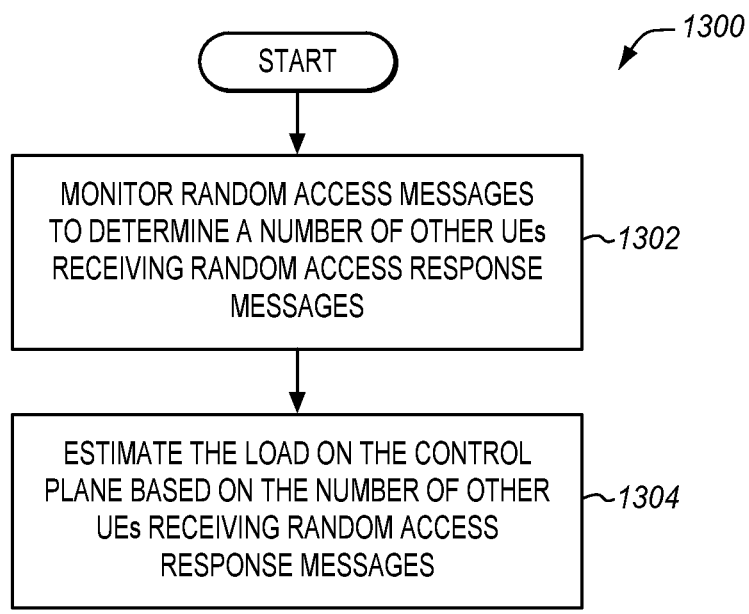
FIG. 13 is a flow chart illustrating another method of estimating a load on the control plane in an illustrative embodiment.

There may be different ways of estimating the load on the control plane 414, some examples of which are shown in FIGS. 12-13. In one example, transmission controller 1034 may monitor the paging channel for the cell that UE 110 is camped on. As described above, if DL data is received for a UE that is idle, core network 130 will buffer the data and request to reestablish bearer connections with the UE by paging cells in the tracking area of the UE. As shown in method 1200 of FIG. 12, transmission controller 1034 monitors paging messages to determine or count the number of other UEs identified in the paging messages (step 1202), such as during a time interval. A paging message includes or more paging records, and the paging records each include a UE identity (e.g., S-TMSI) indicating the intended recipients of the paging message. Thus, transmission controller 1034 may also determine or count the number of UE identities in the paging messages (i.e., the number of different UEs addressed within one or more of the paging messages). Transmission controller 1034 may extend its listening interval and monitor all paging occasions in order to monitor the paging channel in this manner, not just the paging occasion (i.e., offset) for UE 110. Transmission controller 1034 may then estimate the load on the control plane 414 based on the number of other UEs indicated in the paging messages (step 1204).

In another example, transmission controller 1034 may monitor random access messages for a cell, such as on the DL-SCH. As described above, a UE that is in non-connected mode will initiate Random Access procedures to transition to connected mode. As shown in method 1300 of FIG. 13, transmission controller 1034 monitors random access messages to determine or count the number of other UEs receiving random access response messages (e.g., RAR or message-2 of Random Access procedures) (step 1302), such as during a time interval. Transmission controller 1034 may therefore count the number of different UEs addressed by the random access response messages. Transmission controller 1034 may decode random access response messages for all of the UEs (i.e., even if UE 110 did not just perform a random access attempt). Transmission controller 1034 may then estimate the load on the control plane 414 based on the number of other UEs receiving random access response messages (step 1304).

Based on the passive mode transition procedure 1036, UE 110 decides when to transition to connected mode. Thus, a solution to overload conditions on the control plane 414 may be provided in the UEs without any new messaging from mobile network 100. This may be beneficial in that a solution does not need to be network-based. And, UE 110 is proactive in deferring its transition to connected mode instead of being a slave to mobile network 100 in terms of being instructed when to transition to connected mode.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:
(a) hardware-only circuit implementations (such as implementations in only analog and/or digital circuitry);
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof

What is claimed is:

1. User Equipment (UE) configured to communicate with a mobile network over a radio interface, the UE comprising:
at least one processor; and
at least one memory including computer program code executable by the processor;
the processor configured to cause the UE to:
  identify data buffered for one or more applications running on the UE while the UE is in non-connected mode;
  determine, while in non-connected mode, a number of other UEs receiving signaling messages on a control plane to transition from non-connected mode to connected mode;
  estimate a load on the control plane based on the number of other UEs receiving signaling messages to transition from non-connected mode to connected mode; and
  defer a transition of the UE from non-connected mode to connected mode to delay a transfer of the data from the UE to the mobile network over the radio interface when the load on the control plane exceeds a threshold.

2. The UE of claim 1 wherein the processor is further configured to cause the UE to:
transition the UE from non-connected mode to connected mode when the load on the control plane does not exceed the threshold; and
initiate the transfer of the data from the UE to the mobile network over the radio interface.

3. The UE of claim 1 wherein:
the data buffered for the applications comprises background data.

4. The UE of claim 1 wherein:
the data buffered for at least one of the applications comprises Machine-Type Communications (MTC) data.

5. The UE of claim 1 wherein the processor is further configured to cause the UE to:
monitor paging messages to determine the number of other UEs identified in the paging messages.

6. The UE of claim 1 wherein the processor is further configured to cause the UE to:
monitor random access messages to determine the number of other UEs receiving random access response messages.

7. The UE of claim 1 wherein:
the processor is configured to cause the UE to determine the number of other UEs receiving signaling messages over a first time interval; and
the threshold is a percentage of an average load on the control plane over a second time interval that is longer than the first time interval.

8. A method of operating User Equipment (UE) to communicate with a mobile network over a radio interface, the method comprising:
identifying data buffered for one or more applications running on the UE while the UE is in non-connected mode;
determining, while in the UE is in non-connected mode, a number of other UEs receiving signaling messages on a control plane to transition from non-connected mode to connected mode;
estimating a load on the control plane based on the number of other UEs receiving signaling messages to transition from non-connected mode to connected mode; and
deferring a transition of the UE from non-connected mode to connected mode to delay a transfer of the data from the UE to the mobile network over the radio interface when the load on the control plane exceeds a threshold.

9. The method of claim 8 further comprising:
transitioning the UE from non-connected mode to connected mode when the load on the control plane does not exceed the threshold; and
initiating the transfer of the data from the UE to the mobile network over the radio interface.

10. The method of claim 8 wherein:
the data buffered for the applications comprises background data.

11. The method of claim 8 wherein:
the data buffered for at least one of the applications comprises Machine-Type Communications (MTC) data.

12. The method of claim 8 wherein determining the number of other UEs receiving signaling messages on the control plane to transition from non-connected mode to connected mode comprises:
monitoring paging messages to determine the number of other UEs identified in the paging messages.

13. The method of claim 8 wherein determining the number of other UEs receiving signaling messages on the control plane to transition from non-connected mode to connected mode comprises:
monitoring random access messages to determine the number of other UEs receiving random access response messages.

14. The method of claim 8 wherein:
determining the number of other UEs receiving signaling messages on the control plane comprises determining the number of other UEs receiving signaling messages over a first time interval; and
the threshold is a percentage of an average load on the control plane over a second time interval that is longer than the first time interval.

* * * * *